United States Patent

[11] 3,612,546

| | | |
|---|---|---|
| [72] | Inventor | Friedrich Otto<br>Hameln, Weser, Germany |
| [21] | Appl. No. | 27,265 |
| [22] | Filed | Apr. 10, 1970 |
| [45] | Patented | Oct. 12, 1971 |
| [73] | Assignee | A. Stephan U. Sohne<br>Hameln, Weser, Germany |
| [32] | Priority | Apr. 22, 1969 |
| [33] | | Germany |
| [31] | | 6916004 |

[54] RECEPTACLE WITH SHAFT SEAL
14 Claims, 1 Drawing Fig.

[52] U.S. Cl. .......................................... 277/58,
277/138
[51] Int. Cl. ....................................... F16j 15/32
[50] Field of Search............................... 277/58, 59,
138, 164, 165, 152, 153

[56] References Cited
UNITED STATES PATENTS
2,979,345  4/1961  Potter............................ 277/58

3,434,727  3/1969  Kollenberger................  277/58
3,511,512  5/1970  Wheelock ...................  277/58

*Primary Examiner*—Robert I. Smith
*Attorney*—Michael S. Striker

ABSTRACT: In a receptacle a wall is provided with an opening which extends from the inner side to the outer side of the receptacle. An annular member is located at the inner side releasably screwed into the opening and its aperture registers with the latter. A shaft extends through the opening and the aperture from the outer to the inner side of the receptacle and a sealing unit is replaceably carried by the annular member and separable from the wall together with the same. The sealing unit includes two axially spaced elastically yieldable annular sealing elements each of which has an inner circumferential margin engaging the shaft means and an outer circumferential margin engaging the annular member, or a retaining ring located in the aperture of the annular member.

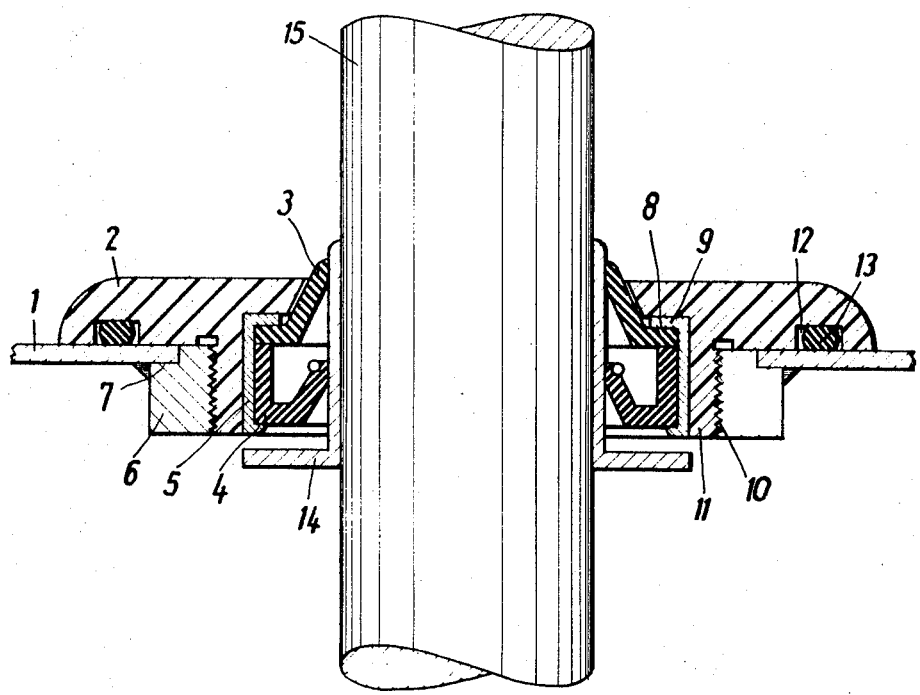

RECEPTACLE WITH SHAFT SEAL

BACKGROUND OF THE INVENTION

The present invention relates generally to receptacles, and more particularly to receptacles a wall of which is penetrated by a rotatable shaft. Still more specifically the present invention relates to a shaft seal for sealing the penetration of such wall by the shaft.

Evidently, if a shaft penetrates the wall of a receptacle then it is usually necessary to seal the penetration if there is a danger that there might be an undesirable leakage out of or into the receptacle. It is, accordingly, well known to provide such a seal, and more particularly it is known to utilize in such a seal a cap-type annular seal in conjunction with a so-called Simmerring, that is a second annular seal of substantially trough-shaped cross-sectional configuration. The seals are arranged axially consecutively with reference to the shaft, and are held in place by a cover plate which is connected to the wall of the container by means of screws whose heads are located at the interior of the container. This, however, has been found to be highly disadvantageous in many respects. On the one hand, the heads of the screws will corrode or be subjected to other deterioration quite rapidly, particularly if the receptacle is intended to contain certain types of matter capable of attacking the material of the screws, and/or if the receptacle is the cutter bowl of a food mixer or the like. Evidently, this makes it difficult if not impossible after a certain time to release the screws when necessary, so that quite frequently any need for removal of the cover plate and of the seal involves drilling out the screws, a time-consuming and expensive practice. This is all the more objectionable because the shaft seal is highly susceptible to wear and must relatively frequently be replaced.

On the other hand, and particularly if the receptacle is intended to accommodate foodstuffs and the like, the presence of the screw heads in the interior of the receptacle is disadvantageous from a point of view of hygiene because it makes cleaning of the receptacle more difficult in view of the fact that matter can accumulate on and around the heads.

Even more importantly, however, is the fact that with these known shaft seals the installation and subsequent removal— for inspection and/or replacement—are exceedingly difficult and time-consuming. The components of the shaft seal must be installed individually. Because the wall of a container, especially if the container consists of drawn sheet materials such as metal, are never or almost never entirely planar, so that the cover plate must be used in conjunction with a liquid sealing agent. All of this can be carried out only by highly skilled technicians if leaking of the shaft seal is to be avoided. This, of course, requires the user of such a receptacle to retain the services of such a technician whenever a new shaft seal must be installed, adding greatly to the maintenance expenses.

An attempt has been made to overcome some of these problems by securing bolts directly on the cover plate which is located at the interior of the receptacle, and to have these bolts extend to the exterior of the receptacle where they are secured by means of nuts. This of course eliminates the presence of screw heads or bolt heads in the interior of the receptacle and thus provides an advantage over the first-described construction. However, this second construction does not solve the problems attendant upon installation and exchange of the seal itself, so that the services of a qualified technician must still be retained at great expense whenever the seal needs to be changed.

SUMMARY OF THE INVENTION

It is, accordingly, an object of the present invention to provide a construction which avoids the aforementioned disadvantages.

More particularly it is an object of the present invention to provide such a construction wherein the shaft seal of a shaft penetrating a wall of a receptacle can be installed and changed readily and without any particular skill, certainly without retaining the services of a specially qualified technician.

A concomitant object of the invention is to provide such a construction which is inexpensive and meets all requirements with respect to hygiene.

A further object of the invention is to provide such a construction which is particularly suitable in conjunction with a receptacle intended to accommodate foodstuffs, such as dough, milk, cheese, meats or the like, especially in a mixer or in a kneading apparatus.

In pursuance of the above objects, and others which will become apparent hereafter, one feature of the invention resides in the provision in a receptacle, of a combination including wall means provided with an opening which extends from the inner side to the outer side of the receptacle. An annular member is located at the inner side in releasable sealing engagement with the wall means and has an aperture registering with the opening. Shaft means extends through the opening and aperture from the outer side to the inner side of the receptacle. A sealing unit is replaceably carried by the annular member and separable from the wall means together with the annular member, such sealing unit including a first and a second axially spaced elastically yieldable annular sealing element mounted in the aperture and surrounding the shaft means in fluidtight relationship with the same and with the annular member.

Advantageously the annular member, which is a cover plate, will consist of synthetic plastic material. It is further advantageous that the sealing elements be a cap-type gasket and a Simmerring or oil-retaining ring, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a fragmentary vertical section illustrating a portion of a receptacle and of a shaft, with the novel sealing unit incorporated.

DESCRIPTION OF THE PREFERRED EMBODIMENTS

Discussing the drawing in detail it will be seen that reference numeral 1 identifies wall means, which is one wall or a portion of the wall of a receptacle. The particular configuration of the receptacle is immaterial for purposes of the present invention and therefore the entire receptacle has not been illustrated. The wall 1 is provided with an opening and at that side of the wall 1 which faces the interior of the receptacle a cover plate or annular member 2 is provided overlying the marginal area of the wall 1 surrounding the opening, and having a tubular extension 11 which extends through the opening. Secured in the opening itself is a retaining ring 6 provided with a shoulder 7 which abuts against the marginal zone of the wall 1 bounding the opening. The ring 6 is secured to the wall 1 by means of the illustrated circumferentially extending weld.

The inner circumferential surface of the ring 6 is provided with internal screw threads which mesh with external screw threads 10 provided on the tubular portion 11 of the annular member 2. Thus, the annular member 2 can be threadedly secured to the retaining ring 6 and thereby to the wall 1. The face of the annular member 2 which when the latter is secured to the wall 1 in the manner illustrated, will face the inner side of the wall 1, is provided with an annular groove 12 in which there is located an O-ring seal 13. As illustrated, when the annular member 2 is connected with the wall 1, the O-ring abuts against the inner side of the wall 1 and thus provides a seal between the wall 1 and the annular member 2. It is evident, of course, that more than one such groove 12 and O-ring 13 could be provided, just as it is clear that the groove 12 could be provided in the inner side of the wall 1, or that two grooves could be provided each of which having approximately half the depth of the groove 12 which is illustrated, and one being located in the inner side of the wall 1 and the other side in the flange 2, with the O-ring being located partially in both grooves.

The annular member 2 has a central aperture which is stepped, that is its cross section decreases in the direction towards the inner side of the receptacle at a step or shoulder as illustrated. Press-fitted and originally retained in this aperture is a retaining ring 5 of metallic material, an axial, radially extending shoulder 9 of which abuts against the shoulder formed by the stepwise decrease of the cross section of the aperture. This is clearly visible in the drawing. Located in the ring 5 is a cap seal or cap gasket 3 which is annular and has the illustrated configuration, it being evident that its inner circumferential edge will engage a shaft 15 extending through the aperture, whereas its outer circumferential edge, which is configurated in form of a radially extending flange, abuts against the shoulder 9 of the ring 5. The gasket 3 is held in place by a second seal which is also annular and of substantially trough-shaped configuration, conventionally known as a Simmerring. Again, an inner circumferential edge of the seal or Simmerring 4 sealingly engages the shaft 15 whereas the outer circumferential edge of the ring 4, which outer circumferential edge is of cylindrical configuration, is frictionally retained in the ring 5 in abutment with the inner circumferential surface of the ring 5, and also in abutment with the outer circumferential edge of the cap gasket 3, retaining the latter in place. The gaskets 3, 4 and the ring 5 together constitute a sealing unit which is replaceable accommodated in the aperture of the tubular portion 11 of the annular member 2. It will be appreciated that both of the gaskets 3 and 4 provide for a sealing action in only one direction, in the illustrated embodiment in the direction from the inside of the receptacle towards the outside.

Advantageously the annular member 2 will be provided with a flattened portion on its circumference so that it can be readily engaged with a wrench for threading it into and out of the retaining ring 6. These flattened portions are not illustrated, however.

It is not necessary, but currently preferred, that there should be interposed between the rotary shaft 15 and the sealing portions of the gaskets 3 and 4 a journaling or running sleeve 14, as illustrated in the drawing. This has the advantage of protecting the shaft 15, for instance the output shaft of a drive, against premature wear, it being known that over a period of time seals such as the Simmerring 4 tend to wear a groove in the material of a rotating shaft which they engage. If this takes place in a construction as illustrated, where the sleeve 14 is provided, it is only necessary to replace the sleeve when such groove has reached an objectionable dimension.

If with the illustrated construction it is necessary or desired to exchange the shaft seals, then it is only required that the annular member 2 be unthreaded by means of a suitable tool from the ring 6, whereupon the retaining ring 5 together with the seals 3 and 4 is removed from the portion 11 as a unit, and a new unit consisting of identical parts is introduced. Advantageously, the O-ring 13 will be replaced at the same time, and to reinstate the shaft seal the procedure just described is simply reversed, it being clearly evident that both the removal and the installation of a new shaft seal can be carried out by almost anyone without requiring particular skills, and certainly without requiring the services of a skilled mechanic or technician.

The defective sealing unit composed of the elements 3, 4 and 5 is then simply discarded, and because these elements are available together as a unit, it is simple to install a new unit in the tubular portion 11, just as it is simple to keep such units in stock. In fact, it is possible to keep in stock replacement units consisting of the elements 2, 3, 4 and 5. In this case the replacement of the shaft seal is even simpler, but of course this is necessary only if the element 2 itself should be subject to wear.

It will be appreciated that the Simmerring 4 can also be inserted in axially reversed position, depending upon whether underpressure or overpressure prevails in the interior of the receptacle.

It is clear that only the smooth upper surface of the annular member 2 is exposed at the inner side of the receptacle, and because the annular member 2 consists advantageously of synthetic plastic material, the construction according to the present invention is highly advantageous with respect to hygienic requirements for food processing machines.

It is of course also possible to provide other arrangements which constitute modifications of the illustrated embodiment. Thus, it is for instance possible to omit the retaining ring and, if the wall 1 has sufficient thickness or is provided with a thickened portion replacing the retaining ring 6, the threads mating with the threads 11 of the tubular portion 11 can be provided directly in the inner surface of the wall bounding the opening. Similarly, it is conceivable to replace the weld connecting the ring 6 with the wall 1 with other securing means, for instance with a suitable adhesive, just as the ring 6 could also be connected with the ring 1 by screw threads.

It will be understood that each of the elements described above, or two or more together, may also find a useful application in other types of constructions differing from the types described above.

While the invention has been illustrated and described as embodied in a receptacle provided with a shaft seal for a shaft penetrating its wall, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various modifications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In a receptacle, in combination, wall means provided with an opening which extends from the inner side to the outer side of said receptacle; an annular member located at said inner side in releasable sealing engagement with said wall means and having an aperture registering with said opening; shaft means extending through said opening and aperture from the outer side to the inner side of said receptacle; and a sealing unit replaceably carried by said annular member and separable from said wall means together with said annular member, said sealing unit including a first and a second axially spaced elastically yieldable annular sealing element mounted in said aperture and surrounding said shaft means in fluidtight relationship with the same and with said annular member.

2. In a receptacle as defined in claim 1, wherein said annular member consists of synthetic plastic material.

3. In a receptacle as defined in claim 1, said annular member comprising a central tubular portion extending through said opening and having said aperture, said tubular portion being provided with an outer circumferential surface and said opening being bounded by an inner circumferential surface; and cooperating screw threads provided in said surfaces and meshing with one another when said annular member extends through said opening.

4. In a receptacle as defined in claim 3, said annular member and said wall means having respective faces which are juxtaposed when said tubular portion extends through said opening; and further comprising a sealing ring surrounding said opening and confined between said faces in sealing engagement therewith.

5. In a receptacle as defined in claim 4, wherein one of said faces is provided with a groove surrounding said opening, and wherein said sealing ring is an O-ring partially received in said groove and extending out of the same into sealing engagement with the other of said faces.

6. In a receptacle as defined in claim 3; further comprising a retaining ring received and frictionally retained in said aperture of said tubular portion; and wherein said sealing elements are located within the confines of said retaining ring and each have a circumferentially complete inner annular portion sealingly engaging said shaft means and a circumferentially complete outer annular portion sealingly engaging said ring.

7. In a receptacle as defined in claim 6, said tubular portion being provided with a radially inwardly projecting annular shoulder intermediate its ends, and said retaining ring abutting against said shoulder.

8. In a receptacle as defined in claim 6, said retaining ring having opposite axial ends one of which is closer to the inner side of said receptacle, said one axial end being provided with a radially inwardly projecting abutment shoulder; wherein said outer annular portion of one of said sealing elements abuts against said abutment shoulder from the direction of the other of said axial ends, and said inner annular portion of said one sealing element projects axially and radially inwardly of said ring into sealing engagement with said shaft means; and wherein the outer annular portion of the other of said sealing elements abuts against said outer annular portion of said one sealing element, maintaining the latter in position.

9. In a receptacle as defined in claim 6, said shaft means comprising a stationary bearing sleeve extending through said aperture in sealing engagement with the respective inner annular portions of said sealing elements, and a rotary shaft extending through said bearing sleeve coaxially therewith and with freedom of rotation relative thereto.

10. In a receptacle as defined in claim 3, said wall means comprising a first element having a hole, and an annular second element fast and fluidtight with said first element and being located in said hole, said second element having said opening and being provided with said inner circumferential surface.

11. In a receptacle as defined in claim 10, said second element being formed with a contact shoulder, and said first element engaging said contact shoulder with an annular marginal portion surrounding said hole.

12. In a receptacle as defined in claim 11; and further comprising a welded seam connecting said first and second elements with one another.

13. In a receptacle as defined in claim 3; further comprising engaging portions provided on said annular member for engagement of the latter with a wrench so as to facilitate threading of said tubular portion into and out of said opening.

14. In a receptacle as defined in claim 1, wherein one of said sealing elements is a cap seal, and wherein the other of said sealing elements is a Simmerring.